(Model.)
P. P. COLER.
GRAIN BINDER.
No. 336,895. Patented Mar. 2, 1886.
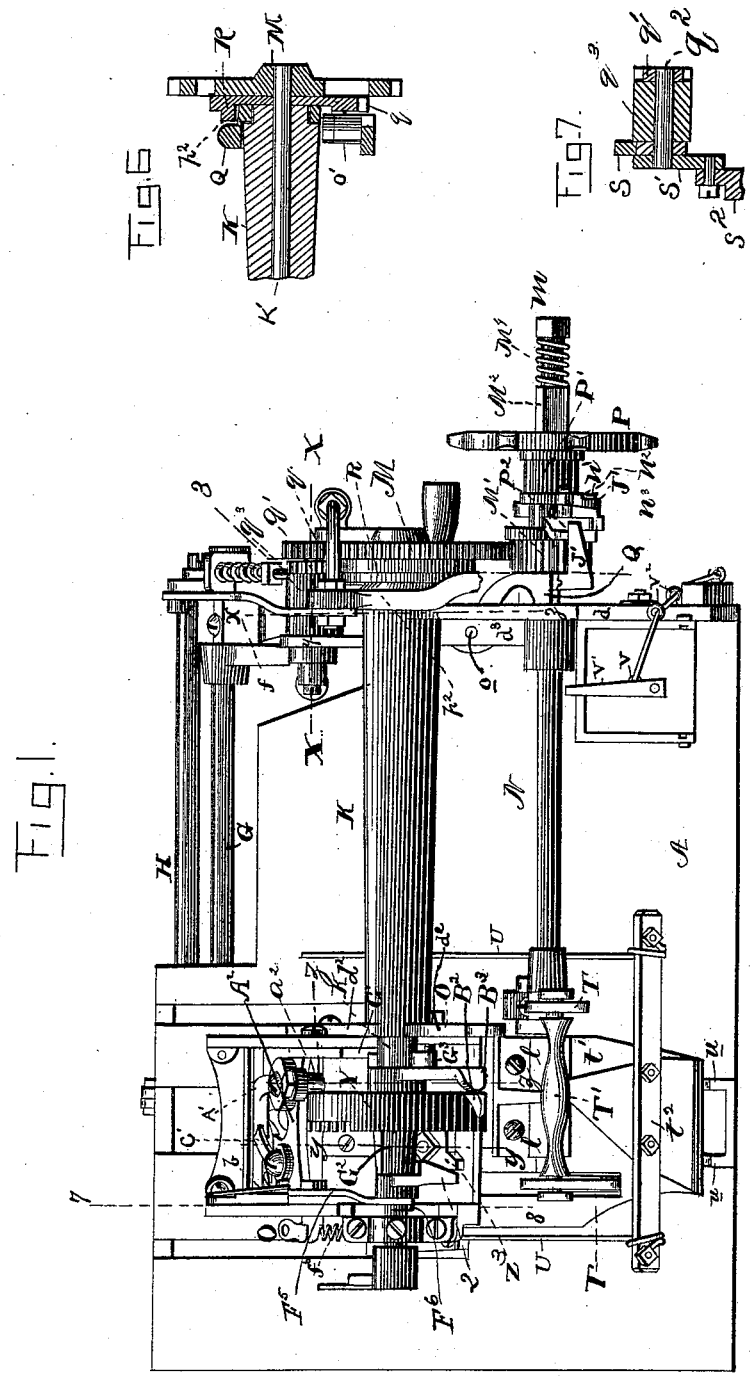

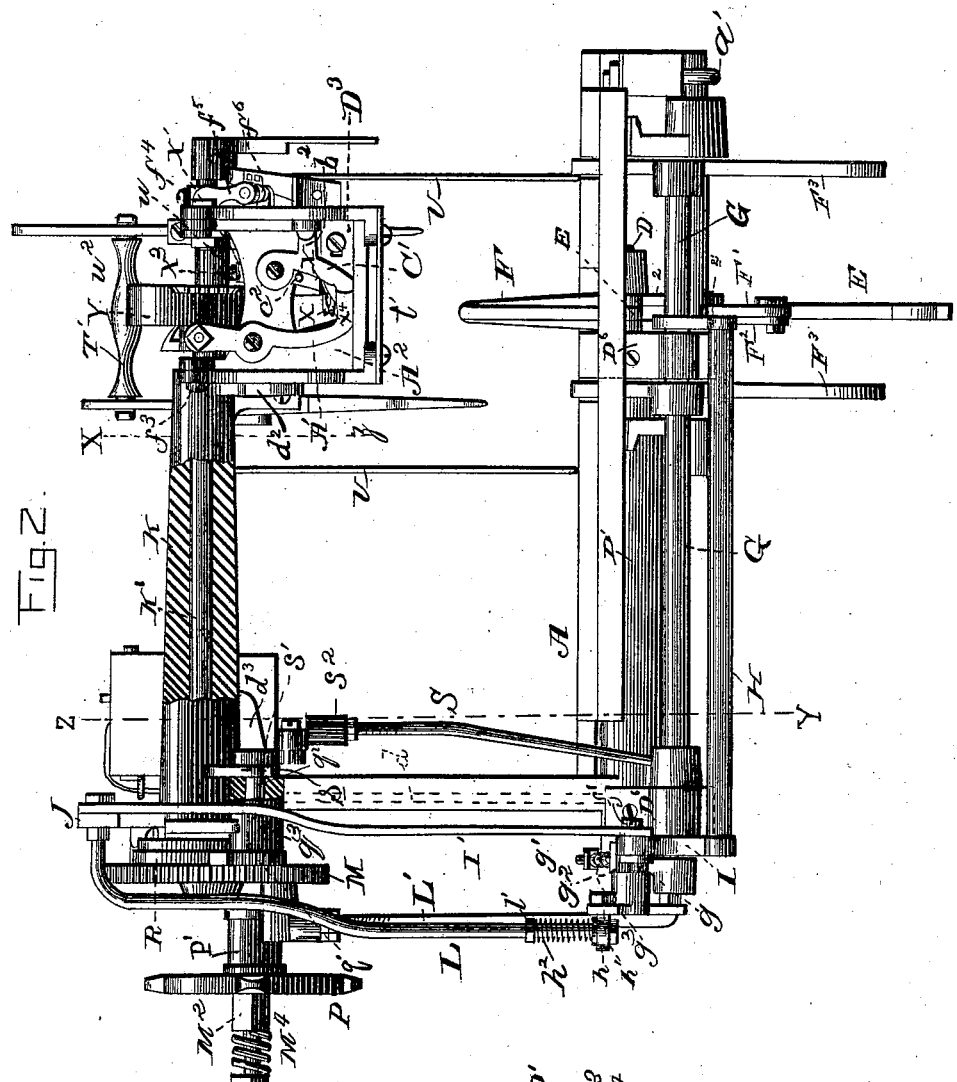

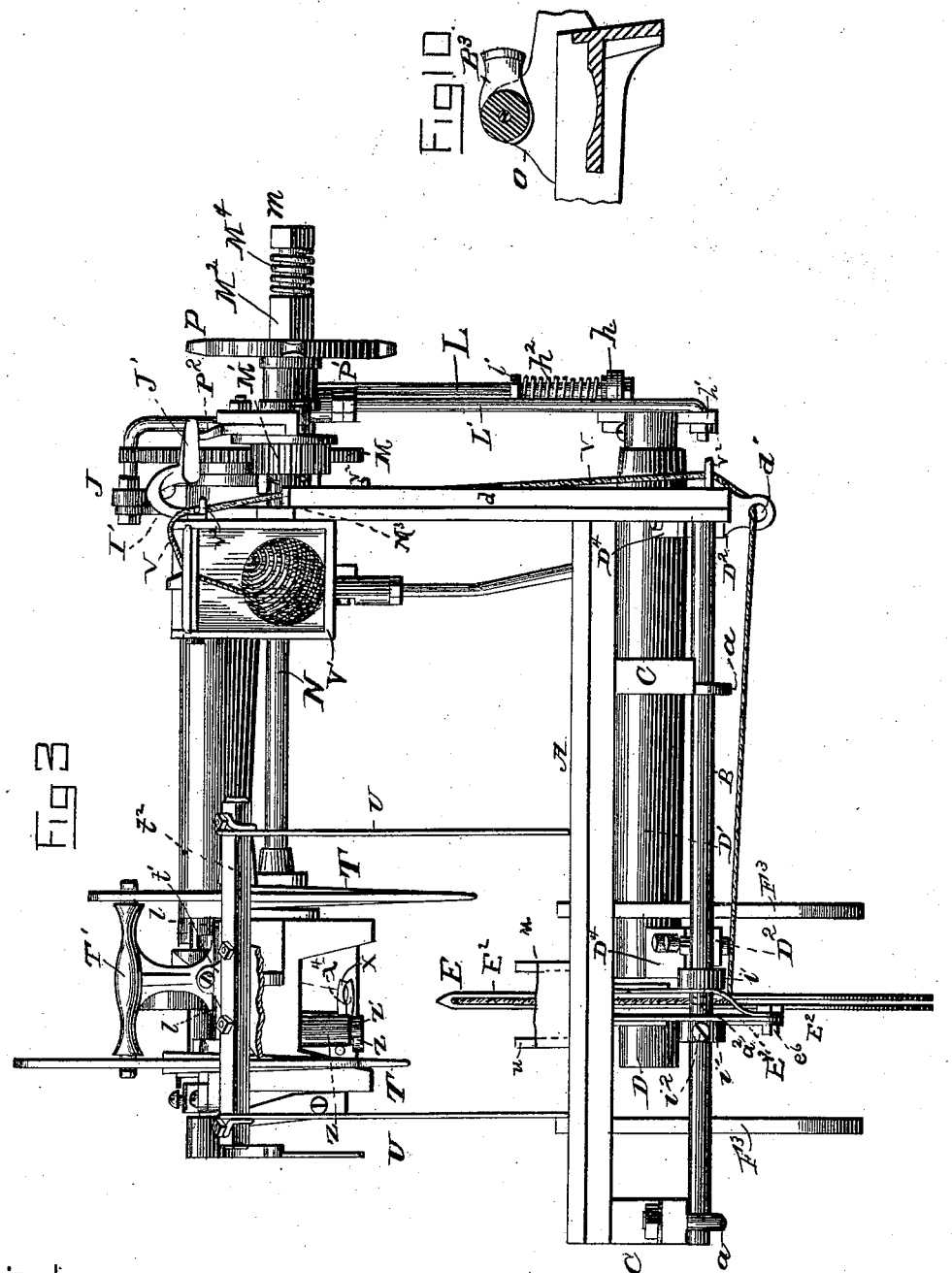

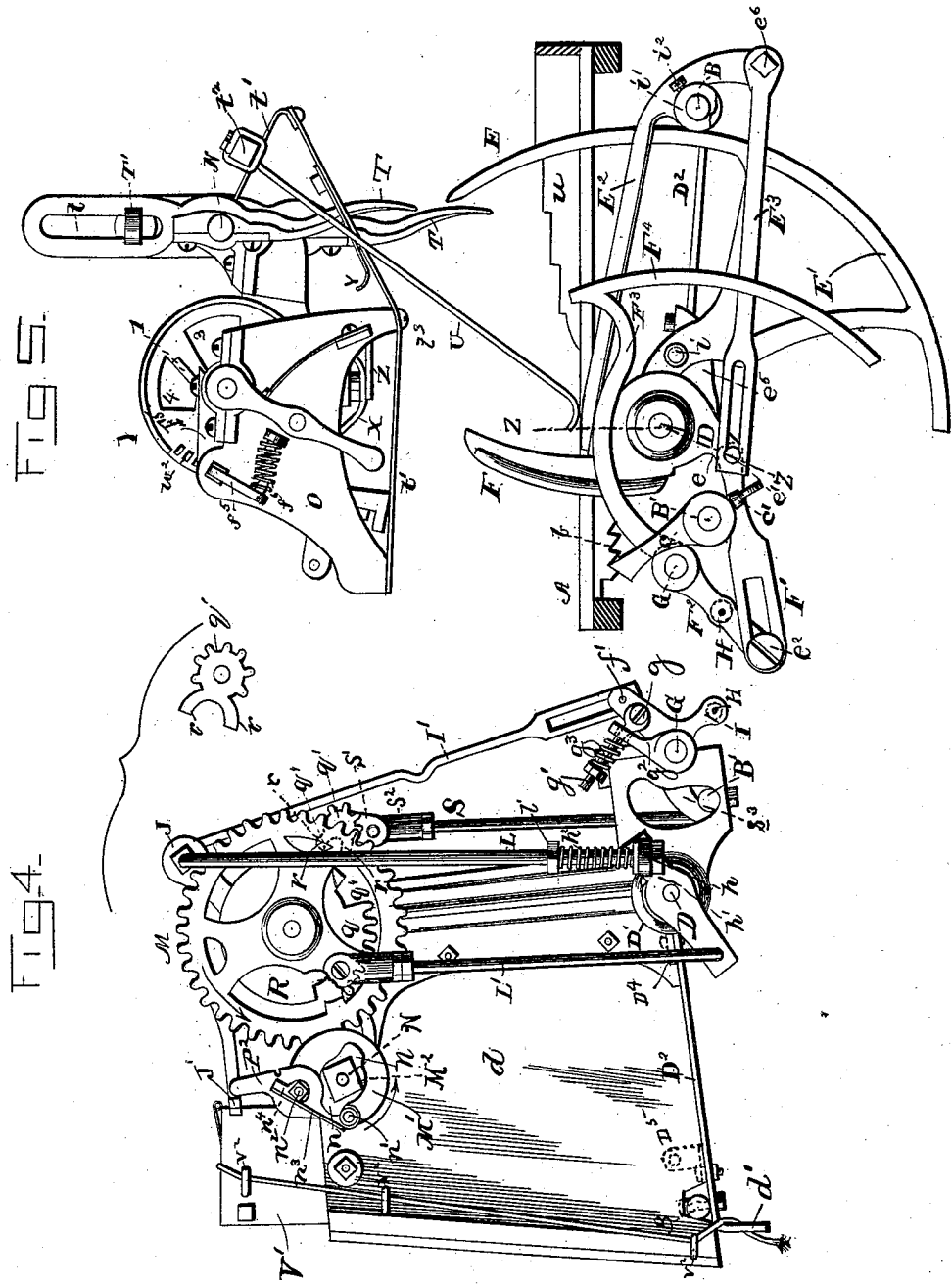

(Model.)
P. P. COLER.
GRAIN BINDER.
No. 336,895. Patented Mar. 2, 1886.
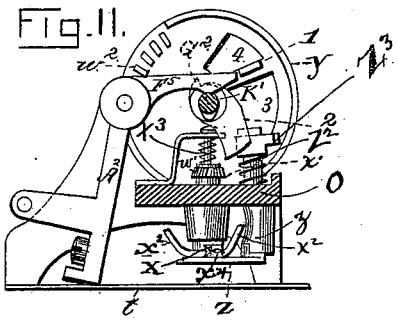
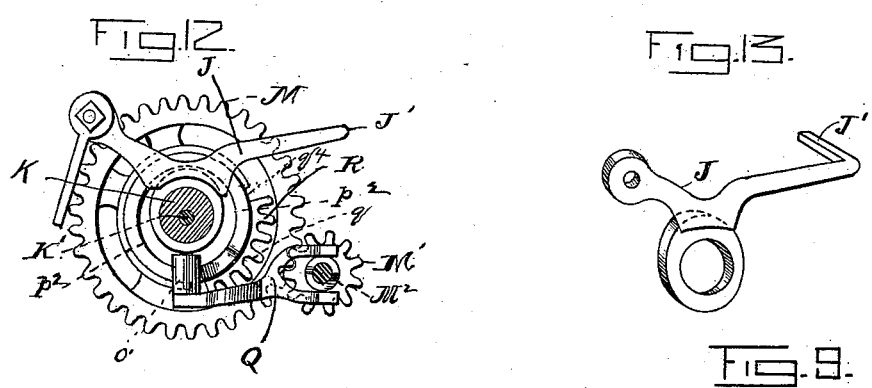
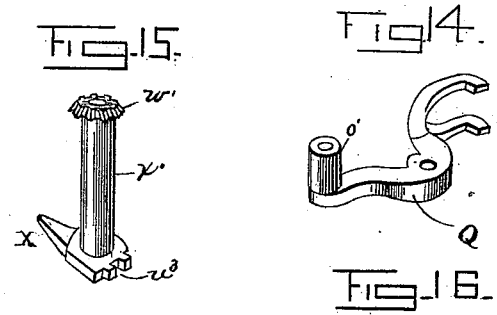
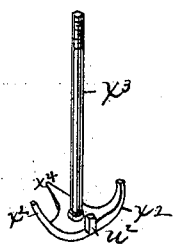
WITNESSES:
N. A. Clark.
O. M. Kramer
INVENTOR
Peter P. Coler
By R. S. H. P. Lacey
ATTYS.

(Model.)

P. P. COLER.
GRAIN BINDER.

No. 336,895.  Patented Mar. 2, 1886.

7 Sheets—Sheet 6.

WITNESSES:
Morris A. Clark.
Van Buren Hillyard

INVENTOR
Peter P. Coler
By R.S. & A.P. Lacey
ATTYS (Model.)
P. P. COLER.
GRAIN BINDER.
No. 336,895. Patented Mar. 2, 1886.
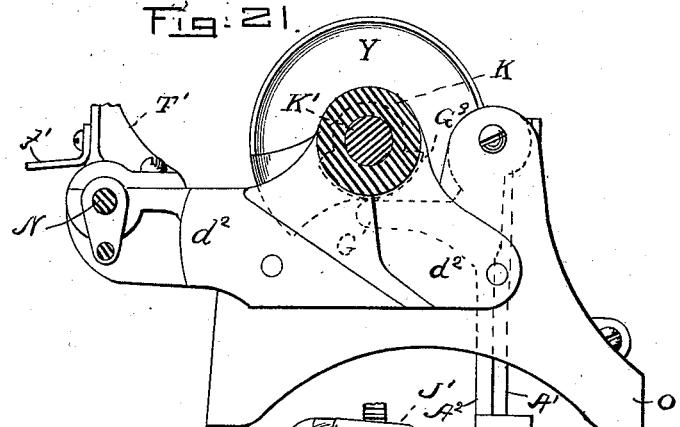
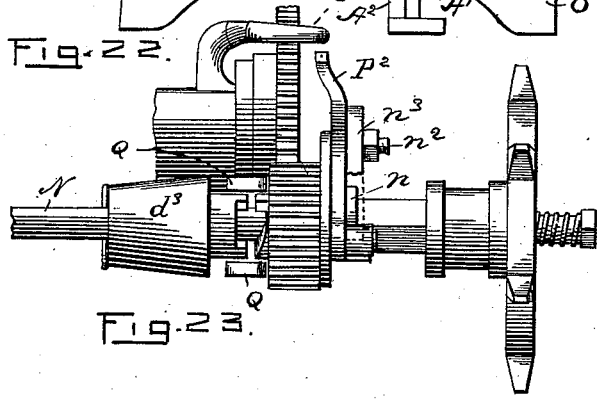
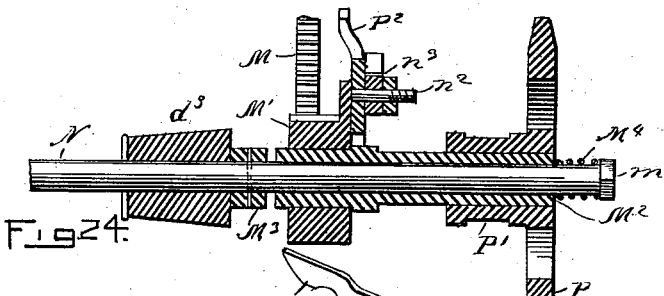
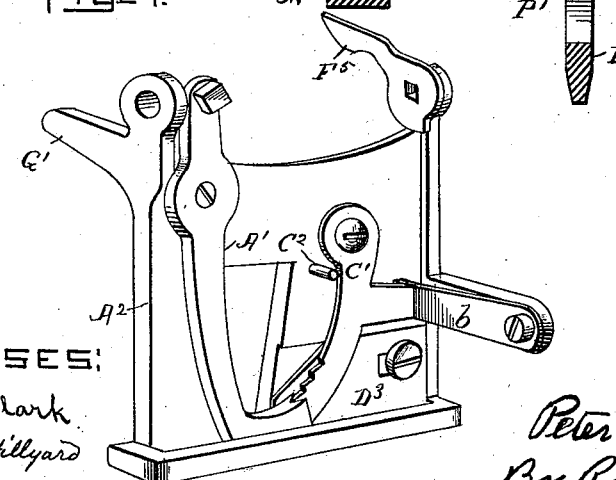
WITNESSES:
Norris A. Clark
Van Buren Hillyard
INVENTOR:
Peter P. Coler
By R. S. & A. Lacey
attys

UNITED STATES PATENT OFFICE.

PETER PAUL COLER, OF CLYMAN, WISCONSIN.

GRAIN-BINDER.

SPECIFICATION forming part of Letters Patent No. 336,895, dated March 2, 1886.

Application filed June 21, 1884. Serial No. 135,624. (Model.)

*To all whom it may concern:*

Be it known that I, PETER P. COLER, a citizen of the United States, residing at Clyman, in the county of Dodge and State of Wisconsin, have invented certain new and useful Improvements in Automatic Grain-Binders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in grain binders; and it consists of the sundry combinations of parts, substantially as hereinafter fully set forth, and pointed out in the claims.

Figure 17:
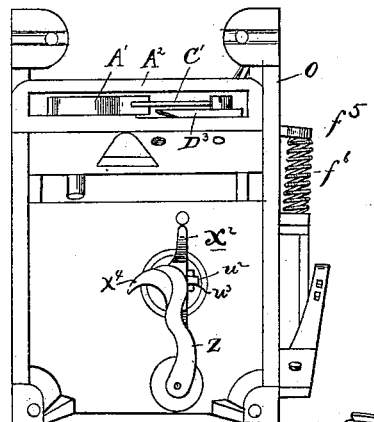
Figure 18:
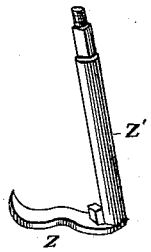
Figure 19:
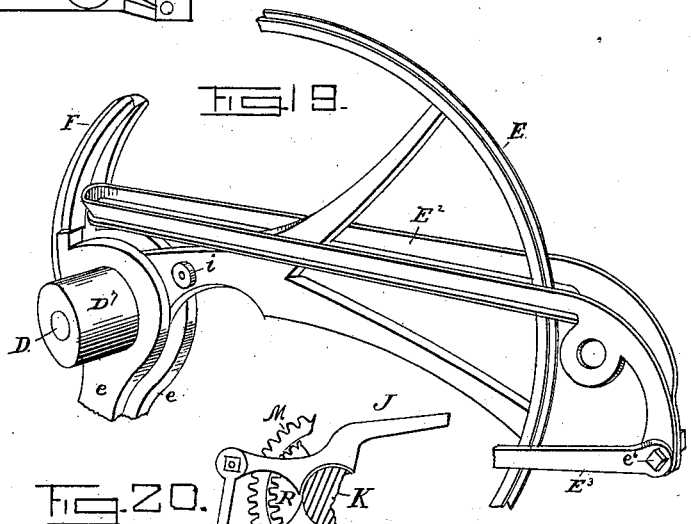
Figure 20:
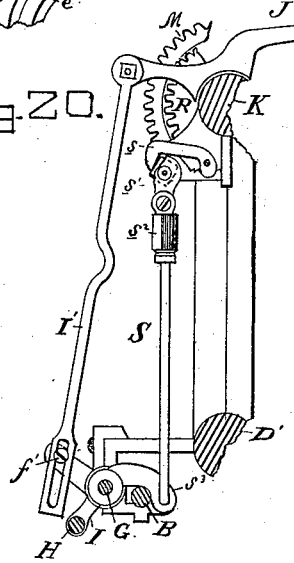

In the accompanying drawings, Figure 1 is a top plan view of a grain-binder embodying my improvements. Fig. 2 is a view from the stubble side. Fig. 3 is a view from the grain side. Fig. 4 is a rear end view; Fig. 5, a front end view of the same parts of the machine, the platform being in section. Fig. 6 shows a longitudinal sectional detail of a portion of the tubular arm of the binder-frame inclosing the knotter-driving shaft, and showing the relative positions of the knotter-driving gearwheel, its segment-toothed disk, and the clutch-shifting lever. Fig. 7 is an enlarged sectional detail on the line X X of Fig. 1. Fig. 8 is a sectional detail on the line Z Z, Fig. 5. Fig. 9 is a detached view of the cord-knotter and loop-stripper on the line Y Y, Fig. 1, the same being shown in section, the means for operating these parts being represented in full lines. Fig. 10 is a view showing the cam-arm which operates the cord-holder, said cam-arm being shown in connection with the knotter-driving shaft and a portion of the knotter-frame. Fig. 11 is a section of the knotting mechanism, taken on the line 7 and 8 of Fig. 1. Fig. 12 is a section on the line X Z, Fig. 1. Fig. 13 is a perspective view of the clutch-shipping lever for throwing the knotter-driving shaft into and out of gear with the main driving-pinion sleeved on the packer-shaft. Fig. 14 is a perspective detail view of the clutch-shifting lever for throwing the packer-shaft out of gear with the main driving-pinion during the operation of bundling and tying. Fig. 15 is a perspective view of a portion of the knotter. Fig. 16 is a perspective view of the other portion of the knotter. Fig. 17 is a bottom plan view of the knotter-carrying frame, with its covering-plate removed. Fig. 18 is a perspective view of the loop-stripper. Fig. 19 is a perspective detail view of a portion of the binder trip-finger, the binder-arm, and the compressor, which latter is represented in full, the parts being shown in their relative positions. Fig. 20 is a section on the line Z Y, Fig. 2, with parts broken away. Fig. 21 is a section on the line X Z, Fig. 2, with parts broken away. Fig. 22 is an enlarged detail view of the clutch and tripping devices for throwing the packers and binding mechanism into and out of operation. Fig. 23 is a longitudinal central sectional view thereof. Fig. 24 is an enlarged perspective view of the swinging plate which carries the cord holding and cutting devices, the latter being shown in their relative positions.

In the organization of a machine embodying my invention I suitably mount the parts hereinafter described in proper position in connection with a reaper or otherwise, A being the binder-platform, which is pivotally connected at its inner side through the rod B to the harvester-frame by pendent eyes $a$, secured by bolts to the ends of cross-pieces C, upon which the platform A is supported. The under side of the platform A is provided with a toothed rack, $b$, which engages with a pawl, $c$, sleeved and adjustably supported upon the outer rod, B', by set or adjusting screws $c'$, the purpose of which is to effect the adjustment of the angle of inclination of the platform as may be desired.

It is evident that while only one rack and pawl is shown, a greater number may be used, if found necessary, the same being a duplication of the parts illustrated.

Occasion will be had hereinafter to again refer to the platform.

D is the needle-shaft, which is supported in the lower tubular arm, D', of the binder-frame, which is firmly bolted near its ends upon one side to transverse supporting-bars D², the fastening-bolts passing through ears or projections D⁴ on the lower tubular arm. The inner ends of the transverse bars D² are bolted to the inner supporting-rod, B, while to one of said bars D² is bolted, near its inner end, a bracket, D⁵, which serves to steady and brace the outer lower end of the end plate or guard, d, of the binder. The extreme inner end of one of the transverse bars D² has a bent or downwardly-projecting portion, which is provided with an eye, d', the function of which will be referred to further on. Upon the needle-shaft D is supported and secured, in any suitable way, the needle or binder-arm E, said binder-arm having, as usual, the extension or guard E'. The binder-arm is of common form, and is provided along its back with a groove for the reception and guidance of the cord, and also with the usual eye at or near its pointed end for the passage of the cord, which latter will be hereinafter more fully referred to.

To the end of the needle-shaft D, which projects beyond the tubular arm D' of the binder-frame, is loosely sleeved a binder trip-finger, F, having a bifurcated hub and downwardly-projecting arm, e, which lie on either side of and embrace the hub of the needle E, which latter, being keyed to the shaft, serves to hold the trip-finger in a fixed position and prevent its having any sliding movement on the shaft D. Between the ends of these arms is pivoted, upon a bolt, e', connecting the arms, one end of the link F', its other end being slotted and connected to a crank-arm, F², hereinafter referred to.

Between the needle-shaft D and the hub of the trip-finger are interposed collars D⁷, which are flush with the hub of the needle. Said collars are keyed to the shaft D, and form bearings for the hub of the trip-finger, which is free to oscillate thereon. One of the downwardly-projecting arms e of said trip-finger is provided with a lateral stud, e³, which projects into a slot, e⁴, in an ear or projection, e⁵, on the lower tubular arm of the binder-frame, to which the end of the bar D² is secured, thereby limiting the movement of the trip-finger.

The compressor E² is made of a single strip of metal folded on itself, forming parallel arms, which are united at their outer ends and pivotally connected at their inner ends to the link E³ by a bolt, e⁶. The arms are slightly expanded near their inner ends, in which portion are formed openings of a size corresponding to the size of the rod B, on which the compressor is mounted and held in place between two collars, i'. The extreme inner ends of the arms curve downward to the point where they unite with the link E³, in order to bring their leverage below their pivotal point. The arms of the compressor are disposed one upon each side of the binder-arm E, the extreme outer end of said compressor moving in a plane just inside of the trip-finger, while the compressor rests upon and is elevated by rollers i, hung upon the sides of the binder-arm, near its shaft. This compressor also serves as a deck or platform trip, the grain pressing thereon, and the pressure acting to pull the heel of the trip-finger inward. At each side of the pivoted end of the compressor, upon the rod B, is arranged a collar, i', one being fixed and the other adjustable by a set-screw, i², which latter arrangement permits the easy removal of the rod B, and also affords a means for taking up wear, as is manifest.

F³ are the "kickers" or bundle-ejectors, each of which consists of a curved arm, with one end firmly secured to a shaft, G, while at its outer end it is provided with a laterally-projecting curved guard, F⁴, movement of the same through the platform A being provided for by slots made in said platform. The action of the kickers will be explained further on. The crank-arm F² is sleeved upon the kicker-shaft G, which is hung in bearings D⁶, formed in projections or ears on the lower tubular arm of the binder-frame. The arm F² has keyed thereto, at a point midway between its ends, one end of rod, H, while the opposite end of said rod H is secured to one arm of a bell-crank lever, I, also sleeved upon the kicker-shaft G. The other arm of the bell-crank lever I is connected by crank-pin f' with a slotted bent connecting-rod I', said pin passing through and sliding in the slot of said rod, while the upper or opposite end of said rod is connected with a clutch-shipping arm, J, which is sleeved upon a hub on the upper tubular arm, K, of the binder-frame, which incloses the knotter-driving shaft K' at its free end, the function of which will appear further on. The upper tubular arm, K, of the binder-frame is cast with lugs d² d³, near its opposite ends, to the rear one of which is bolted the end plate or guard, d, and to the other of which one side of the knotter-supporting frame O is bolted. The upper arm of the bell-crank I is also provided with a headed pin or projection, g, which passes through the eye of and is thus connected to a short rod, g', passed loosely through a crank-arm, g², or the end of the kicker-shaft G, and encircled by a spring, g³, confined upon said rod by a nut, and bearing against said nut and arm g², the purpose of which connection is to permit the trip-finger F to yield to the pressure of the grain in forming the bundle without imparting any movement to the kicker-shaft, said connection serving as a means to return the trip-finger to its normal position after the operation of the kickers and during the time when the latter are returning to their first position.

Through that end of the clutch-tripping arm J to which the rod I' is connected is passed the upper bent end of the rod L, which restores the clutch-tripping arm to its normal position, the latter forming the means of connection of the rod I' to said clutch-tripping arm J. The lower end of the rod L passes through a swiveled eyebolt, h, of an arm, h', on the binder-arm shaft D. Said rod L has a spring coiled around its lower end above the eyebolt, between which and a nut, l', on the rod, said spring is confined, and forms a yielding connection, h², with said swiveled bolt to permit the independent movement of the rod L, together with the clutch-tripping arm. The rod L holds the clutch-trip arm J, with its hook J', out of the path of the clutch-dog, when the binder-arm E moves forward, carrying the cord, at which time also the pinion M' of the sprocket-driving wheel P will be held out of engagement with, and thus prevent the action of, the packer-shaft N, during which interval, and while the grain is being bound, the kickers will remain inactive till after the binding is completed, when they will operate in a manner hereinafter noted.

The crank-arm $h^3$ on the end of the needle-shaft D is connected by a rod, L', to the driving-gear wheel M, secured upon the shaft K'. The gear-wheel M is geared to a small pinion, M', loosely mounted on a clutch-sleeve, $M^2$. The packer-shaft N is supported in bearings formed in the ears $d^2$ $d^3$, cast with the upper tubular arm, K, of the binder-frame. The sleeve $M^2$ is loosely mounted on the packer-shaft, and moved automatically into engagement with a clutch-sleeve, $M^3$, fixed to the packer-shaft N by a spring, $M^4$, disposed upon the shaft N between the outer end of said sleeve $M^2$ and a nut, $m$. Upon the end of said shaft, upon the loose angular sleeve $M^2$, is a sliding sleeve, P', having a sprocket-wheel, P, integral therewith, to which motion is imparted for operating the entire binder. The sleeve $M^2$, which is driven by the sprocket-wheel P, also carries two studs or projections, $n$ $n$, which at different times engage with a frictional roller, $n'$, on the clutch-dog $P^2$, pivoted upon a stud, $n^2$, of a projection upon one side of the pinion M', said roller $n'$ of the clutch-dog being held in engagement with one of the projections $n$ when the hook J' of the clutch trip-arm J is elevated during the binding of the bundle by a spring, $n^3$, fastened to an arm, $n^4$, secured to the pin $n^2$, which forms the pivotal point of the clutch-dog $P^2$. During the engagement of one of said projections $n$ with the roller of clutch-dog $P^2$ the latter will be so disposed that as the clutch trip-arm J, with its hook J', is moving downward toward said dog, which it is gradually doing during the recession of the binder-arm, the trip-hook J' will, upon the completion of said operations, strike, and so affect said clutch-dog $P^2$ as to throw its arm having the roller $n'$ out of engagement with and out of the path of the projections $n$ of the sleeve $M^2$, thus disconnecting the pinion M' and the sleeve $M^2$, which latter is actuated by the sprocket-wheel P, before mentioned. At the moment the separation between the sleeve and pinion takes place the sleeve $M^2$ engages the clutch $M^3$ in a manner hereinafter described, when the packers are again set in motion to act upon another quantity of grain.

Q is a clutch-shifting forked lever, which is pivoted at $o$ to the projection $d^3$ of the upper tubular arm, K, of the binder-frame, one arm of said lever having a roller, $o'$, adapted to engage with a cam-flange, $p^2$, on the inner side of the wheel M, while its forked arm, which embraces the fixed clutch-sleeve $M^3$, upon which it also slides, is adapted to act upon the sliding clutch-sleeve $M^2$, so as to hold said sleeve out of engagement with the fixed clutch-sleeve $M^3$ during the bundling and tying operation, and thus prevent motion being communicated to shaft N; but which shifting-lever Q will, after the accomplishment of the aforesaid operations, be retracted or moved away from the clutch-sleeve $M^2$, and allow it to engage with the clutch-sleeve $M^3$, to transmit motion to the shaft N at the moment the ejectment of the bundle takes place, as will be noted further on.

The wheel M has also upon its inner side a disk, R, provided with a toothed segment. From the side face of the disk an annular cam-faced flange, $p^2$, projects. The teeth $q$ of said disk gear at the proper time with a small pinion, $q'$, whose shaft $q^2$ is supported in a tubular casting, $q^3$, on the upper tubular arm of the binder-frame K. The disk R is provided at each end of its toothed segment $q$ with a notch or recess, $q^4$, into one of which enters one of the two projections $r$ of the pinion $q'$ as the pinion begins to gear with said segment, while the other tooth enters the other notch upon the escape of the pinion from said segment. After such escape of the pinion the said projections $r$ come in contact with the plane surface or periphery of said disk during the revolution of the gear-wheel M, holding the pinion $q'$ motionless at the same time—namely, when the pinion is at rest. A dog or hook, $s$, pivoted to a projection on the tubular arm K of the binder-frame, fits or rests upon a squared surface of the shaft $q^2$ to more effectively enable the projections $r$ $r$ to hold the pinion $q'$ against movement when at rest.

To the crank-arm $s'$ on the shaft $q^2$ is connected by a pin and a screw-threaded sleeve, $s^2$, together with a nut, a rod, S, which connects by a curved crank-arm, $s^3$, with the kicker-shaft G, whereby said shaft will be so actuated as to cause the kickers $F^3$ to be moved back and forth in the arc of a circle intermittently, so as to "kick" or throw the bundle off the platform after having been formed and bound, and be moved back under the table after such operation, the pinion $q'$, the primary moving power of said kickers, being so adjusted or adapted with relation to the toothed segment $q$ of the disk R as to cause the kickers to move toward and to act upon the bundle of grain when said binder-arm, together with the compressor, moves away from the bound bundle.

T T are the packers, which are pointed, slightly-curved bars hung about centrally of their lengths upon oppositely-projecting cranks on the shaft N to effect the alternate action of the same in packing and accumulating the grain while the latter is falling upon the platform preparatory to the binding of the bundle. The upper ends or portions of the packers are slotted at $t$, to permit the said packers to have a rising and falling movement, the same being guided in their movements by a T-shaped head or casting, T', the base of which forms one-half of the box which supports the shaft N, and is fastened upon the knotter-frame O. The arms of the head or casting T' serve as guides for said packers, the ends of said arms projecting through the slots $t$ of the packers.

To the upper side of the base of the T-shaped casting T' is bolted or fastened the upper overhanging plate or covering, $t'$, bent about midway of its length, as represented at $t^3$, where it is secured to the inner legs of the knotter-frame O, while the extreme forward end of said plate is secured to the outer legs of the said frame. Upon the upper side of the rear end of the plate or covering is secured a cross-bar, $t^2$, having forwardly-projecting pendent flexible arms or stiff wires U, against which the grain accumulates. The platform A is provided at its inner side with inclined notched flanges $u$, one on each side of the opening or slot in said platform, through which the binder-arm passes to resist the pushing back of the grain as the packer-arms alternately withdraw from operation. In or about the middle of the plate or covering $t'$ is formed the binder-arm slot, above the rear edge of which is disposed and secured to said plate a flat spring, Y, which, as the binder-arm E passes through said slot, cleans the eye portion of said arm and the end of the cord which it is designed to carry of any foreign substances or grain that may have fallen thereon.

V is the binding-cord, a ball of which is held in the box V', suitably supported at the rear inner corner of the end plate or guard, $d$, of the machine, said cord being passed out of said box through an aperture, $v$, and under a spring, $v'$, fastened to the top of said box to possess it of the requisite tension, after which said cord is passed down through eyes $V^2$, one being secured to one side of said box and the other being fastened to the outer surface of the end guard, $d$, while another, $d'$, as before described, is formed upon one of the transverse supporting-bars $D^2$. The cord is next passed from or through the eye $d'$ to an aperture, $a^2$, in the bar B, between the arms of the compressor, and thence through the eye of the binder-arm E. The cord is now passed into the knotter-frame O, and by pulling the tripping device F, which in practice is done by the gavel of grain pressing thereon, so as to trip the binder, and by turning the sprocket-wheel P, thereby putting the other mechanism in action, the cord still being held by the hand, the binder-arm E will be caused to move upward, when its forward or threaded end will carry the cord through said knotter-frame O and put it into the cord-holder, after which the machine is in condition to bind the bundle, which operation will be described hereinafter.

The knotter consists of a rotary vertical tubular shaft, $x'$, provided at its lower end with a slightly upward-curved radial jaw, X, the upper end of said shaft passing through the top plate of the frame O, and bearing in a support or casting upon the upper side of said top plate. Said shaft is hollow or tubular, and through it passes a spring-actuated stem or rod, $x^3$, which is provided at its lower end with arms $x^4 x^2$, the former of which acts as a jaw, in conjunction with the jaw X on the said shaft $x'$, to grasp the cord as it is fed thereto by the binder-arm E, as above described. The other two arms curve upward and act as guards to prevent the cord wrapping around the knotter-shaft or its bearing during the operation and formation of the knot. To cause the opening and closing of the said jaws, the shaft K', which extends directly over and slightly above the knotter, has a cam, $G^2$, which actuates the rod $x^3$, which for this purpose is provided with an adjustable head or shoulder, and a spring normally pressing upward upon the head to effect the closing of said jaws after the release of the rod $x^3$ from the cam $G^2$. The shaft $x'$ is also rotated to enable it to loop the cord held by the jaws forming in part the knotting operation, said shaft having at its upper end a beveled pinion, $w'$, gearing with and intermittently driven by a segmental row of teeth or cogs, $w^2$, upon one side of a gear and cam wheel, Y, secured upon the shaft K', and by means of which, as above stated, the knotter-shaft is rotated.

It will be observed that the heel of the jaw X projects slightly beyond the shaft $x'$, and has a notch, $u^3$, formed therein, adapted to receive a projection, $u^2$, of the shaft $x^3$ in such a manner as to permit the free vertical movement of the shaft $x^3$ during the operation of grasping and releasing the cord, but will cause the shaft $x^3$ to rotate simultaneously with the shaft $x'$ during the rotation of the latter in the formation of the knot. This arrangement also causes the conjunction of the cord-grasping jaws of the knotter, and prevents their getting out of alignment.

During the rotation of the knotter while forming the knot the outwardly and upwardly curved arms $x^2$ of the shaft $x^3$ deflect the cord downwardly and prevent its entangling or interfering with the knotter by wrapping around the same or its pendent bearing-support.

Z is the loop-stripper, which is connected to a shaft, Z', extending through a hollow cylinder or box, $z$, fastened to the top plate of and depending therefrom within the knotter-frame O, contiguously to the knotter-shaft. At or upon the upper end of the loop-stripper shaft Z' is a spring, $Z^2$, and above the latter said shaft is provided with a pinion, $Z^3$, said spring permitting the loop-stripper to accommodate itself to the rising and falling movement of the lower jaw of the knotter, and holding said stripper in contact with said jaw during the operation of forming or making the knot. The teeth of the pinion $Z^3$ are engaged by a cam or projection, 1, on the wheel Y, just after the knotter, with its jaws X $x^2$, has been rotated by the teeth $w^2$ of said wheel as the latter is rotated by wheel Y on the shaft K', to cause the loop-stripper Z to pull the loop off the knotter X $x^2$, while immediately following the disengagement of the pinion $Z^3$ from the cam-projection 1 on the wheel Y the teeth of said pinion will be acted upon by a cam-arm, 2, carried by the shaft K' on the side of the stripper-shaft pinion opposite the wheel Y, so as to impart a reverse movement to the loop-stripper and cause it to return to its normal position for the removal of the next knot, when a repetition of the first or forward movement of the stripper takes place. In order to prevent the interference of the cam-wheel Y with the pinion $Z^3$ after the latter has escaped from the projection 1, and to allow it to be reversed by the contact of the cam-arm 2 therewith, the surface of the wheel Y is cut away, as at 3, upon one side of the projection 1, while upon the opposite side of the latter the surface of said wheel is cut away to produce an aperture, 4, into which a tooth of the pinion $Z^3$ enters just previous to the engagement of the next tooth of said pinion with the said projection to impart the requisite stroke to the loop-stripper and certainty of action of said parts.

A' is a cord-holder jaw, which consists of a hooked lever pivoted near its upper portion to a swinging frame or plate, $A^2$, the upper end of said lever having a friction-roller, $a^2$, which is deflected by a cam-arm, $B^3$, on the wheel Y into a cam-groove, $B^2$, in the rim of the wheel Y, the action of which is to open the cord-holder jaw. The lower end of the jaw A is slotted to receive the lower end of a co-operating serrated jaw, C', which constitutes a part of the cord-holder, and is pivoted at its upper end to the same plate or frame, $A^2$, said jaw being held in contact with the lever A' by a spring, $b$, and prevented, when said lever is withdrawn therefrom, from moving only a slightly limited distance by a stop or stud, $C^2$. The knife or cutter $D^3$ for severing the cord is adjustably secured to the plate $A^2$, as shown at the right-hand side of the needle-opening therein, and near the bottom edge of the said plate, directly in rear of the clamping ends of the lever A' and jaw C', the plate or frame $A^2$ is pivotally supported upon or connected to the upper and outer corners of the knotter-frame O by means of pivots $f^3 f^4$, the latter, $f^4$, having an arm, $f^5$, extending downward outside of the frame O, and connected by a spring, $f^6$, to a stud projecting from side of the frame, the purpose of which will presently appear. From the upper end of one side bar of the plate $A^2$ extends inwardly a fixed arm, $F^5$, which engages with a cam, $F^6$, on the shaft K', the purpose of which is to cause the inward movement of the plate $A^2$, in order to allow the cord held by the holder connected to said plate, as above stated, to readily yield to the looping action of the knotter. The spring $f^6$ returns the swinging plate $A^2$ to its normal or original position. A second fixed arm, G', extends inwardly from the holder-carrying plate or frame $A^2$, below the shaft K', and from the opposite side of said plate, said arm being acted upon by a cam, $G^3$, upon the shaft K', so as to hold the plate firmly or immovably when at the maximum limit of its outward movement.

In operation, when the binder-arm E puts the cord around the bundle of grain, the knotter makes a revolution, looping the cord around and in the jaws, which retain the cord by the action of the parts before described. At this junction the cord-holder lever A' releases the cord previously fed to it by the binder-arm E, as above stated, and grasps the end of the new cord and forces it in contact with the knife $D^3$, thus severing the cord. The knot-stripper now acts and a knot is formed in the cord, the kickers $F^3$, arriving immediately thereafter at their maximum limit of movement, discharge the bundle of grain from the platform.

I claim—

1. In a grain-binder, the combination, with the packing and binding mechanism, of the curved binder-arm, its supporting-shaft, a tripping-finger loosely mounted on said shaft, a compressor connected with the heel of said tripping-finger, and mechanism connected with the binder-arm shaft and actuated by either the tripping-finger or compressor to throw the packers out of action previous to the binding of the grain, substantially as and for the purposes set forth.

2. In a grain-binder, the combination of the knotter-operating shaft K', gear-wheel M, keyed to its outer end, the needle-arm shaft D, crank h', and rod L', connecting the latter shaft with the gear-wheel, the packer-shaft, a two-part clutch, $M^3 M^2$, mounted thereon, the former fixedly, the latter loosely, and continuously rotated, a pinion sleeved on the movable part of the clutch so as to slide thereon and revolve therewith and meshing with the gear-wheel M, a pawl, $P^2$, pivoted on a stud projecting from the side of the pinion, a spring attached to said stud and bearing on the pawl, and lugs $n$, projecting from the clutch within the path of the pawl $P^2$, substantially as and for the purposes set forth.

3. In a grain-binder, the needle and its shaft connected to the knotter-driving shaft, the latter being intermittently operated from the packer-shaft, in combination with the clutch-trip lever J, sleeved on the hub of the tubular frame inclosing the knotter-driving shaft, its end J', adapted to disengage the clutch between the packer-shaft and the knotter-driving shaft, rods L and I', attached directly to the other end of the clutch-trip lever J, and the lower end of the rod L being yieldingly connected to a crank on the needle-shaft to permit the independent movement of the rod L when the clutch-trip lever is thrown out of the normal or operative position to allow the engagement of the packer and knotter-driving shafts, the lower end of the rod I' being slotted and connected to a crank on the kicker-shaft by a pin passed through said slot to permit the operation of the kickers before the lever J is returned to a normal position, as and for the purposes specified.

4. In a grain-binder, the combination of the needle and its shaft, the knotter-driving shaft, the gear-wheel M, keyed thereto, the packer-shaft, a clutch, $M^2 M^3$, a pinion, $M'$, sleeved on the part $M^2$ of the clutch so as to turn therewith and meshing with the wheel M, the lever Q, having one end bearing on the pinion and the other on a cam-flange projecting laterally from the wheel M, a pawl and lug to lock the pinion to the part $M^2$ of the clutch, a clutch-trip lever, J, to disconnect the pawl and lug, rods L and $I'$, connected directly to said lever and to crank-arms of the needle and kicker shafts, respectively, and a rod, $L'$, connecting the wheel M with a crank of the needle-shaft, substantially as and for the purposes set forth.

5. In a grain-binder, the combination of the knotter-driving shaft, a gear-wheel, M, keyed thereto and having a cam-faced annular flange, $p^2$, projecting laterally from its side, the packer-shaft, a two-part clutch, $M^3 M^2$, mounted thereon, the part $M^3$ fixedly, the latter part, $M^2$, loosely, to have a longitudinal movement on the packer-shaft only, a spring, $M^4$, a pinion, $M'$, sleeved on the part $M^2$ of the clutch so as to turn therewith and meshing with the gear-wheel M, and the lever Q, pivoted midway between its ends to vibrate horizontally, one of its ends carrying a roller to bear against the face of the cam-flange $p^2$, the other end of said lever being forked and having its arms extended one on either side of the clutch and resting upon the side of the pinion $M'$, as and for the purposes described.

6. In a grain-binder, the combination of the compressor loosely mounted on a shaft beneath the table, the front or outer end of the compressor projecting up through an opening in the table, its inner end connected with the heel of the binder-trip finger by a link slotted at its outer end at its point of connection with the trip-finger to permit a yielding of the latter independent of the compressor, as and for the purposes set forth.

7. In a grain-binder, the combination, with the binder-arm and its shaft, of the compressor linked to the heel of the binder-tripping finger and operated by rollers on said binder-arm, substantially as and for the purposes set forth.

8. The combination, with the knotter-driving shaft having cams $F^6 G^3$, and the knotter-frame O, of a plate, $A^2$, carrying the cord holding and cutting devices pivotally connected to the upper outer corners of the frame O by pivots $f^3 f^4$, an arm, $f^5$, extended downward outside of the frame O, a spring, $f^6$, interposed between the end of said arm and a stud on the frame, arms $F^5 G'$, projecting inwardly from the upper ends of the plate and adapted to bear upon the cams $F^6 G^3$, respectively, as and for the purposes set forth.

9. In a grain-binder, the platform pivoted at its inner side to the harvester-frame and having a rack on its under side, in combination with an adjustable supporting-arm pivoted to the harvester-frame under the binder-table, substantially as and for the purposes set forth.

10. In a grain-binder, the combination of the knotter-driving shaft having cams $F^6 G^3$, cam-arms $B^3$, and cam-grooved wheel Y, the latter two forming the cam-groove $B^2$, the knotter-frame, the knotter mechanism, a plate pivoted to the knotter-frame and having inwardly-projecting arms to engage the cams $F^6 G^3$, a cord-holding jaw, $A'$, pivoted to the plate and having an extension to project within the cam-groove $B^2$, a co-operating serrated jaw, $C'$, spring $b$, and the knife $D^3$, all arranged and operating substantially as described.

11. In a knotting mechanism for grain-binders, the knotter composed of the shafts $x' x^3$, having cord-holding jaws $X x^4$, respectively, and guard-arms $x^2$, the heel of the jaw X of the former shaft having a notch, $u^3$, into which a projection, $u^2$, of the latter shaft projects, a spring giving the shaft $u^3$ an upward thrust to close the jaws, a cam on the knotter-driving shaft to open the jaws, a pinion on the shaft $x'$, a loop-stripper, a spring exerting an upward pressure on the stripper-shaft, a pinion keyed to the upper end of the latter, a wheel, Y, on the knotter-driving shaft and provided with teeth $w^2$ and projection 1 to actuate the knotter and stripper shafts, respectively, at successive intervals of time, and a cam-arm, 2, located on the knotter-driving shaft on the side of the stripper-shaft opposite the wheel V to return the loop-stripper to its normal position.

In testimony whereof I affix my signature in presence of two witnesses.

PETER PAUL COLER.

Witnesses:
 JOHN SAAR,
 PETER DIX.